United States Patent
Barrow et al.

(10) Patent No.: US 7,437,171 B1
(45) Date of Patent: Oct. 14, 2008

(54) SYSTEM AND METHOD FOR LONG DISTANCE DISPATCH CALLING RESTRICTIONS

(75) Inventors: Steven Wesley Barrow, South Riding, VA (US); Arun Manroa, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 304 days.

(21) Appl. No.: 11/192,127

(22) Filed: Jul. 29, 2005

Related U.S. Application Data

(60) Provisional application No. 60/611,704, filed on Sep. 22, 2004.

(51) Int. Cl.
*H04B 7/00* (2006.01)

(52) U.S. Cl. ............... 455/518; 455/414.1; 455/415; 455/417; 455/519; 455/90.2; 379/210.01; 379/210.02

(58) Field of Classification Search ............ 379/210.01, 379/210.02; 455/517, 518, 519, 520, 521, 455/450, 414.1, 417, 432.1, 90.1, 90.2, 90.3, 455/422.1, 433, 432.3, 415; 370/260, 390
See application file for complete search history.

(56) References Cited

U.S. PATENT DOCUMENTS

| 5,491,835 | A  | * | 2/1996 | Sasuta et al. ............. 455/509 |
| 6,208,872 | B1 | * | 3/2001 | Schmidt .................. 455/518 |
| 6,937,856 | B2 | * | 8/2005 | Baudino et al. ........... 455/418 |
| 6,937,873 | B2 | * | 8/2005 | Levy et al. ............... 455/521 |
| 2001/0018342 | A1 | * | 8/2001 | Vialen et al. ............. 455/423 |
| 2004/0192367 | A1 | * | 9/2004 | Barros et al. ............. 455/521 |
| 2004/0209650 | A1 | * | 10/2004 | Pearce .................... 455/558 |
| 2004/0219925 | A1 | * | 11/2004 | Ahya et al. ............... 455/450 |

* cited by examiner

*Primary Examiner*—Charles N Appiah
*Assistant Examiner*—Olumide T Ajibade Akonai

(57) ABSTRACT

A method and system for long distance dispatch calling restrictions are provided. A user who does not subscribe to long distance dispatch services can make a long distance dispatch call to the originator of the last received dispatch call within a predetermined period of time of the last received dispatch call. If an amount of time equal to or greater than the predetermined period of time has elapsed since the last received dispatch call, then the long distance dispatch call is rejected.

20 Claims, 2 Drawing Sheets

SYSTEM AND METHOD FOR LONG DISTANCE DISPATCH CALLING RESTRICTIONS

This application claims priority under 35 U.S.C. § 119 to U.S. Provisional Application No. 60/611,704 filed Sep. 22, 2004, the entire disclosure of which is herein expressly incorporated by reference.

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly known as a walkie-talkie or push-to-talk (PTT) type of call such as Nextel's service identified by the trade name Direct Connect.

There are many differences between interconnect and dispatch communication services. For example, interconnect calls are provided in a circuit-switched manner, so that the call is maintained until one of the parties terminates the call using, for example, a call end button. In contrast, an inactivity timer is used during a dispatch call. If either party to the call does not communicate for a predetermined amount of time, the inactivity timer expires and the call is torn down. If either party depresses the PTT button, within a predetermined amount of time after the call has been torn down, the call is reestablished without requiring the party to enter a telephone number or select a telephone number from a mobile station's address book. Accordingly, a call may be torn down and reestablished without any knowledge of this process by the user of the wireless communication device.

The inactivity timer used for dispatch calls can cause a number of problems that are not encountered by interconnect calls. These problems result in user dissatisfaction, particularly because users are not aware of the inactivity timer. Accordingly, it would be desirable to reduce problems caused by the inactivity timer.

SUMMARY OF THE INVENTION

One problem caused by the inactivity timer occurs during long distance dispatch calls. For example, if a user who subscribes to a long distance dispatch service makes a long distance dispatch service call to a user who does not subscribe to long distance dispatch service and the inactivity timer expires, only the user who subscribes to the long distance dispatch service can reestablish the call. Because users are not aware of the inactivity timer, and accordingly, still believe that a call is established, numerous problems can arise. For example, the user who does not subscribe to long distance dispatch service may depress the PTT button expecting to send voice information to the other party, only to receive an indication that the call cannot be completed. Further, the inactivity timer may expire while the user who subscribes to long distance dispatch service is waiting for a response from the other user. When the user who subscribes to long distance dispatch services does not receive a response, due to the other user's inability to initiate a long distance call, the user may become frustrated.

To address the above-identified and other problems, the wireless network can be configured to allow a user who does not subscribe to long distance dispatch services to make a long distance dispatch call to the originator of the last received dispatch call within a predetermined period of time of the last received dispatch call. If a period of time equal to or greater than the predetermined period of time has elapsed since the last received dispatch call, then the long distance dispatch call is rejected.

DETAILED DESCRIPTION OF THE PREFERRED EMBODIMENTS

Figure 1:
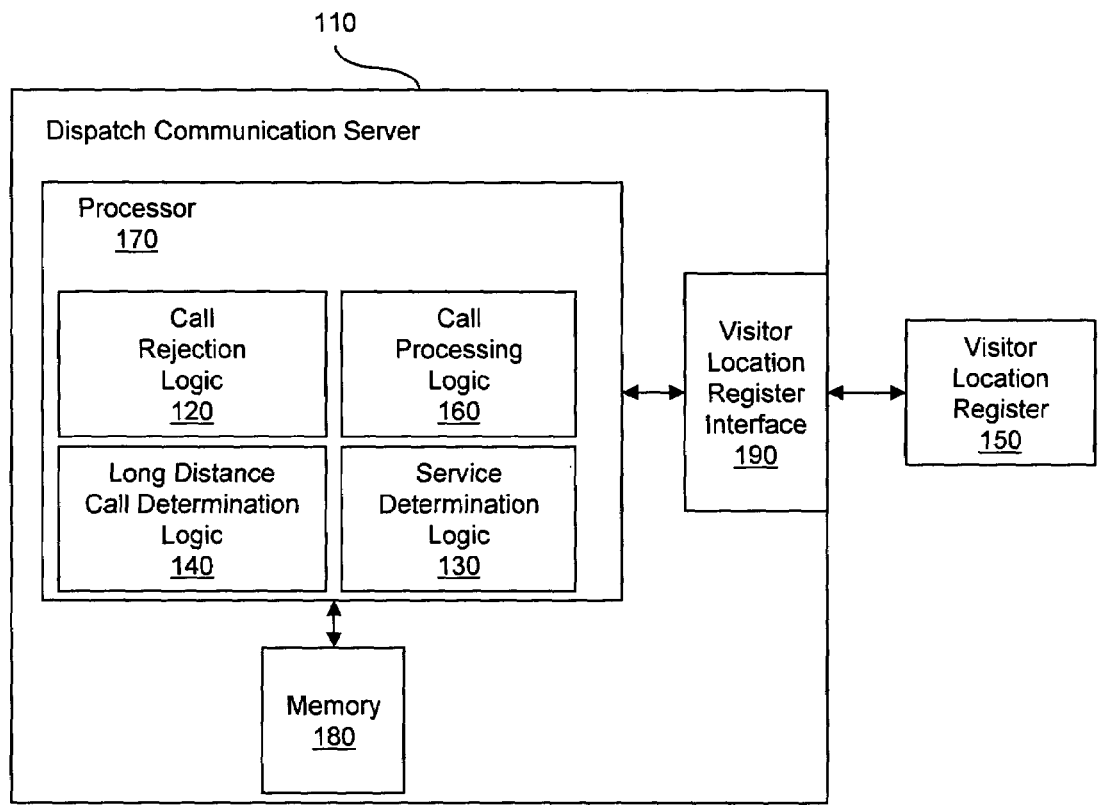
FIG. 1 is a diagram of an exemplary dispatch communication server in accordance with the present invention.

FIG. 1 is a diagram of an exemplary dispatch communication server 110 in accordance with the present invention. Typically, in a dispatch communication system each mobile station communicates with a dispatch communication server, which is responsible for tracking mobile terminals within the network and setting up calls. A dispatch communication system is divided into a number of geographical areas known as urban areas. An urban area includes a dispatch complex that can comprise multiple dispatch communication servers, each dispatch communication server communicating with multiple mobile stations. In this type of dispatch communication system, a long distance call is considered to be a call between two dispatch complexes.

Dispatch communication server 110 comprises processor 170, memory 180 and visitor location register interface 190. Processor 170 includes call rejection logic 120, service determination logic 130, long distance call determination logic 140 and call processing logic 160, all of which will be described in more detail below. Processor 170 can be a microprocessor running program code, and application specific integrated circuit (ASIC), field programmable gate array (FPGA), or the like. The visitor location register interface 190 allows processor 170 to communicate with visitor location register (VLR) 150, which stores, among other things, information about previously received calls such as the location of the call originator, and at what time a call occurred.

Memory 180 is coupled to processor 170, and can be used for storing a program which is loaded into and executed by processor 170, and other functions of a dispatch communication server memory. Memory 180 can be random access memory, read only memory, flash memory, a hard drive and/or the like. Memory 180 can include a program that is loaded by processor 170 for executing the various logic functions.

Figure 2:
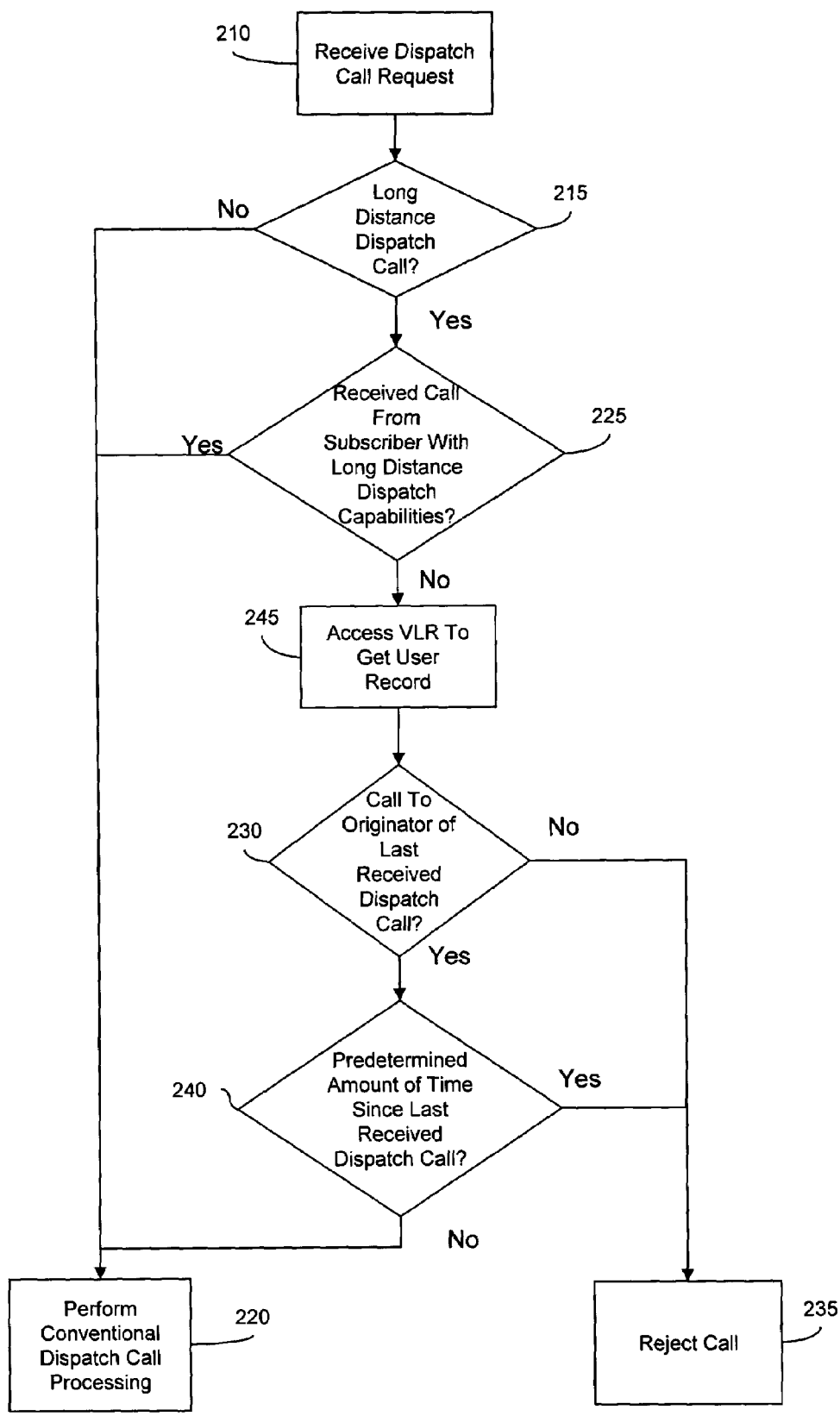
FIG. 2 is a flow diagram illustrating an exemplary method for dispatch call processing in accordance with the present invention.

FIG. 2 is a flow diagram illustrating an exemplary method for dispatch call processing in accordance with the present invention. When a dispatch call request is received by dispatch communication server 110 (step 210), the long distance determination logic 140 determines whether it is a long distance dispatch call (step 215). If the call is not a long distance dispatch call ("No" path out of decision step 215), then conventional dispatch call processing is performed by call processing logic 160 (step 220). If, however, it is a long distance dispatch call ("Yes" path out of decision step 215), then the service determination logic 130 determines whether the call originated from a user that subscribes to long distance dispatch services (step 225). If user subscribes to a long distance dispatch call service ("Yes" path out of step 225), then conventional dispatch call processing is performed by call processing logic 160 (step 220).

If the call originated from a user without long distance dispatch capabilities, i.e., the user does not subscribe to long distance dispatch call services ("No" path out of step 225), then the dispatch communication server 110 accesses the VLR 150 (step 245), through the visitor location register interface 190, to obtain the call originator's user record. The user record is checked to determine whether the call is to the originator of the last received dispatch call by that user (step 230). If the call is not to the originator of the last received dispatch call ("No" path out of step 230), then the call rejection logic 120 rejects the call (step 235).

If the call is to the originator of the last received dispatch call ("Yes" path out of step 230), then the dispatch communication server 110 checks the user record to determine whether a predetermined amount of time (e.g., 10 minutes) has elapsed since the last received dispatch call (step 240). If a period of time equal to or greater than the predetermined amount of time has elapsed since the last received dispatch call ("Yes" path out of step 240), then the call rejection logic 120 rejects the call (step 235). If, however, less than the predetermined amount of time has elapsed since the last received dispatch call ("No" path out of step 240), then conventional dispatch call processing is performed by call processing logic 160 (Step 220).

The present invention has been described as addressing problems caused by inactivity timers in dispatch networks. However, the present invention also addresses the problem that occurs when a user who does not subscribe to long distance dispatch service has a long distance call dropped due to poor radio frequency coverage, network congestion, or the like.

Although the present invention has been described in connection with restrictions on long distance dispatch calls, the present invention is equally applicable to other types of call service restrictions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for restricting calls, the method comprising the acts of:
   receiving a call request from a call originator for a destination, wherein the call request is subject to a call service restriction;
   rejecting the call request when (i) the call originator does not subscribe to the call service and (ii) a period of time equal to or greater than a predetermined amount of time has elapsed since the last received call for the call originator.

2. The method of claim 1, further comprising the act of:
   allowing the call request when (i) the call originator does not subscribe to the call service and (ii) a period of time less than the predetermined amount of time has elapsed since the last received call for the call originator.

3. The method of claim 2, further comprising the act of:
   determining that the call originator received the previous call from the destination.

4. The method of claim 3, wherein the call service is a long distance call service.

5. The method of claim 4, wherein the long distance call service is a dispatch call service.

6. The method of claim 5, wherein a dispatch communication server determines whether the predetermined amount of time has elapsed.

7. The method of claim 6, further comprising the act of:
   obtaining information associated with the call originator from a visitor location register, wherein the obtained information is used to determine whether the predetermined amount of time has elapsed.

8. A dispatch communication server, comprising:
   a processor, which comprises
      restricted call determination logic for determining if a call from a call originator is subject to a call service restriction;
      service determination logic for determining that the call originator does not subscribe to the call service; and
      call rejection logic for rejecting the call if a period of time equal to or greater than a predetermined amount of time has elapsed since the call originator received a previous call.

9. The dispatch communication server of claim 8, the processor further comprising:
   call processing logic for processing the call subject to the call service.

10. The dispatch communication server of claim 9, wherein the call subject to call service is a long distance call.

11. The dispatch communication server of claim 10, wherein the long distance call is a dispatch call service.

12. The dispatch communication server of claim 11, wherein the previously received call is a last call received.

13. The dispatch communication server of claim 12, further comprising:
   a visitor location register interface for obtaining information used for determining whether the predetermined amount of time has elapsed.

14. A computer readable medium encoded with computer executable instructions for:
   receiving a call request for a call from a call originator for a destination, wherein the call request is subject to a call service restriction;
   rejecting the call request when (i) the call originator does not subscribe to the call service and (ii) a period of time equal to or greater than a predetermined amount of time has elapsed since the last received call for the call originator.

15. The computer-readable medium of claim 14, further comprising computer executable instructions for:
   allowing the call request when (i) the call originator does not subscribe to the call service and (ii) a period of time less than the predetermined amount of time has elapsed since the last received call for the call originator.

16. The computer-readable medium of claim 15, further comprising processor executable instructions for:
   determining that the call originator received the previous call from the destination.

17. The computer-readable medium of claim 16, wherein the call service is a long distance call service.

18. The computer-readable medium of claim 17, wherein the long distance call service is a dispatch call service.

19. The computer-readable medium of claim 18, wherein a dispatch communication server determines whether the predetermined amount of time has elapsed.

20. The computer-readable medium of claim 19, further comprising computer executable instructions for:
   obtaining information associated with the call originator from a visitor location register to determine whether the predetermined amount of time has elapsed.

* * * * *